(12) United States Patent
Rockett et al.

(10) Patent No.: US 7,406,169 B2
(45) Date of Patent: Jul. 29, 2008

(54) METHOD AND SYSTEM FOR AUTOMATED UNIT SERVICE REQUESTS FROM A TELEMATICS UNIT

(75) Inventors: David W. Rockett, Lake Orion, MI (US); Gary A. Watkins, Royal Oak, MI (US)

(73) Assignee: General Motors Corporation, Detroit, MI (US)

( * ) Notice: Subject to any disclaimer, the term of this patent is extended or adjusted under 35 U.S.C. 154(b) by 396 days.

(21) Appl. No.: 10/797,733

(22) Filed: Mar. 10, 2004

(65) Prior Publication Data

US 2005/0201545 A1 Sep. 15, 2005

(51) Int. Cl.
*H04M 3/00* (2006.01)
(52) U.S. Cl. .................. 379/265.01; 455/419
(58) Field of Classification Search .......... 379/265.01–265.14; 455/419, 12.1
See application file for complete search history.

(56) References Cited

U.S. PATENT DOCUMENTS

| | | | |
|---|---|---|---|
| 6,960,990 B2 | 11/2005 | McKibbon | 340/426.35 |
| 7,123,141 B2 * | 10/2006 | Contestabile | 340/539.13 |
| 2002/0174360 A1 * | 11/2002 | Ikeda | 713/200 |
| 2003/0139173 A1 | 7/2003 | Mazzara, Jr. et al. | 455/418 |
| 2003/0139179 A1 * | 7/2003 | Fuchs et al. | |
| 2003/0143976 A1 | 7/2003 | Wang | 455/405 |
| 2003/0162525 A1 | 8/2003 | Stefan et al. | 455/405 |
| 2003/0190030 A1 * | 10/2003 | Alton | |
| 2003/0217002 A1 | 11/2003 | Enborg | 705/41 |
| 2004/0012501 A1 | 1/2004 | Mazzara et al. | 340/870.11 |
| 2004/0023647 A1 | 2/2004 | Mazzara, Jr. et al. | 455/419 |
| 2004/0029574 A1 | 2/2004 | Mazzara, Jr. | 455/419 |
| 2004/0193343 A1 * | 9/2004 | Tan et al. | |
| 2004/0203569 A1 * | 10/2004 | Jijina et al. | |
| 2004/0203692 A1 | 10/2004 | Schwinke et al. | 455/419 |
| 2004/0259524 A1 | 12/2004 | Watkins et al. | 455/405 |
| 2004/0266392 A1 | 12/2004 | Jiddou | 455/406 |
| 2005/0017851 A1 | 1/2005 | Allison | 340/425.5 |
| 2005/0027438 A1 | 2/2005 | Rockett et al. | 701/200 |
| 2005/0100148 A1 | 5/2005 | Watkins et al. | 379/114.2 |
| 2005/0201545 A1 | 9/2005 | Rockett et al. | 379/265.01 |
| 2006/0052092 A1 | 3/2006 | Schwinke et al. | 455/415 |
| 2006/0082471 A1 | 4/2006 | Rockett et al. | 340/988 |

FOREIGN PATENT DOCUMENTS

WO   WO 03/081560   *  2/2003

* cited by examiner

*Primary Examiner*—William J Deane

(57) ABSTRACT

The current invention provides a method for automated unit service requests from a telematics unit. A unit request call trigger is set at the telematics unit from a call center. A unit request call is received based on the unit request call trigger. The telematics unit is configured in response to the received unit request call. A computer usable medium with suitable computer program code is employed for automated unit service requests from a telematics unit.

20 Claims, 3 Drawing Sheets

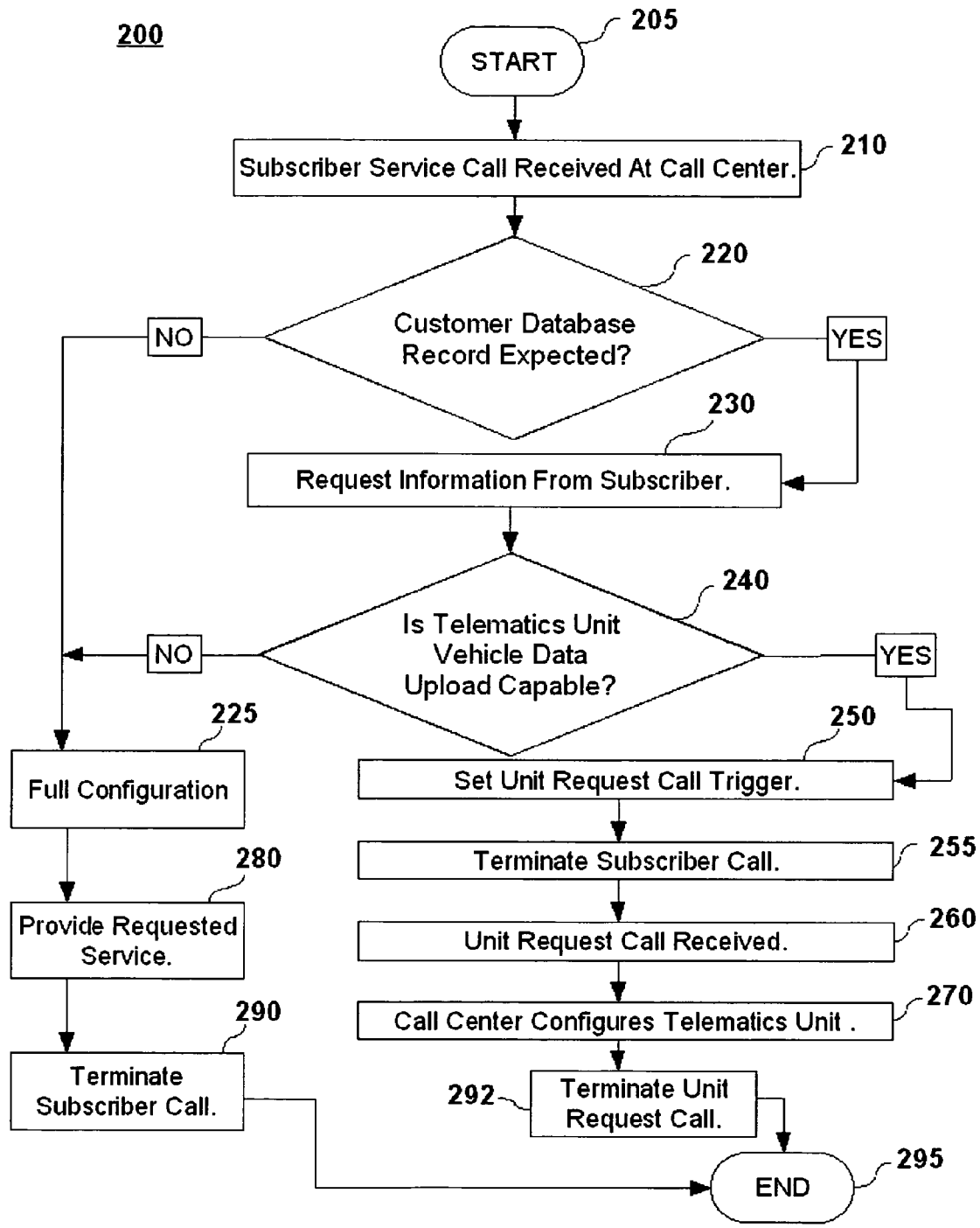

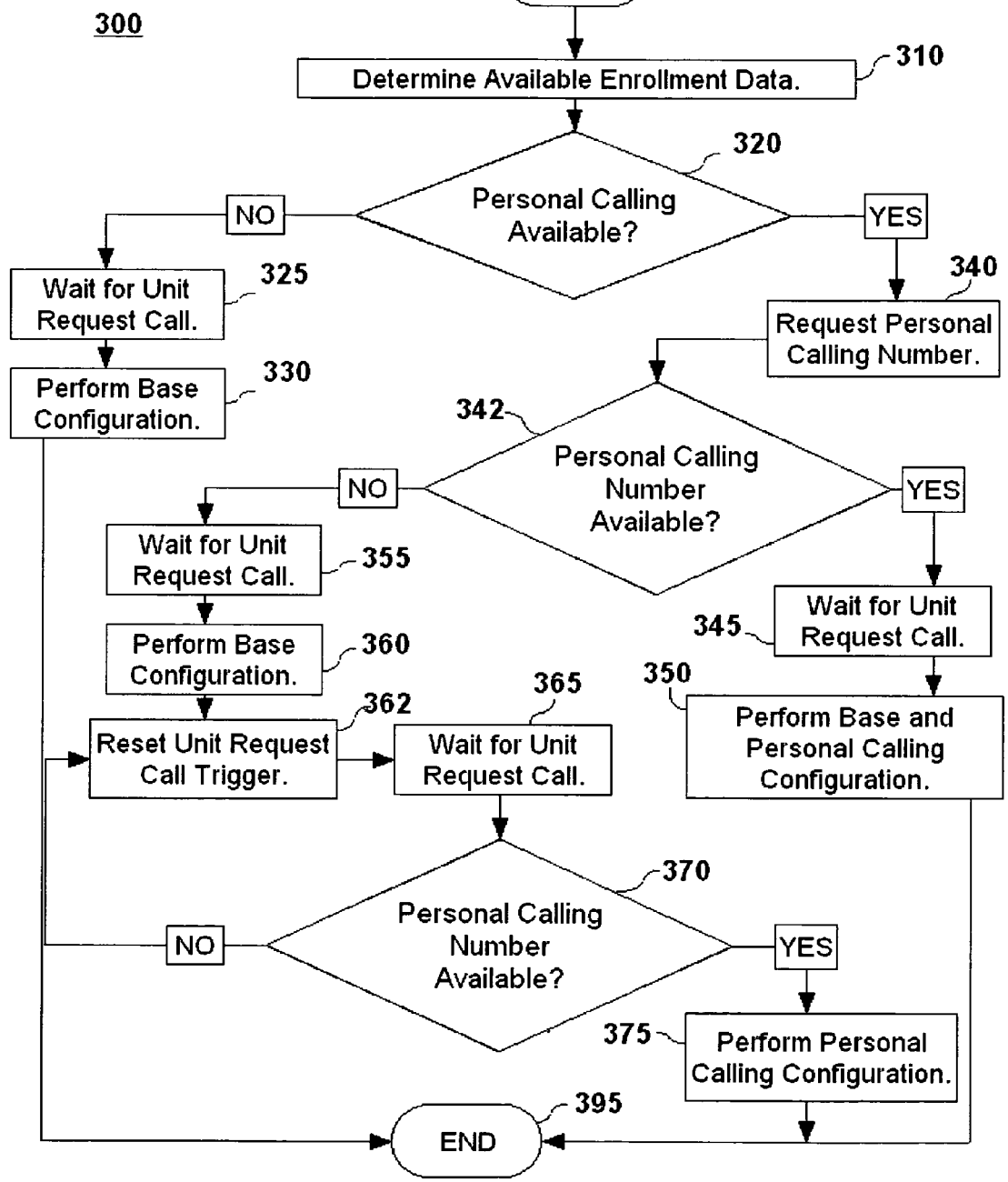

METHOD AND SYSTEM FOR AUTOMATED UNIT SERVICE REQUESTS FROM A TELEMATICS UNIT

FIELD OF THE INVENTION

This invention relates generally to telematics systems. In particular, the invention relates to a method and system for automated unit service requests from a telematics unit.

BACKGROUND OF THE INVENTION

One of the fastest growing areas of communications technology is related to automobile network solutions. The demand and potential for wireless vehicle communication, networking and diagnostic services have recently increased. Although many vehicles on the road today have limited wireless communication functions, such as unlocking a door and setting or disabling a car alarm, new vehicles offer additional wireless communication systems that help personalize comfort settings, run maintenance and diagnostic functions, place telephone calls, access call-center information, update controller systems, determine vehicle location, assist in tracking vehicle after a theft of the vehicle and provide other vehicle-related services.

A telematics unit installed in a vehicle facilitates communications to and from the vehicle. Drivers can call telematics call centers and receive navigational, concierge, emergency, and location services, as well as other specialized help such as locating the geographical position of a stolen vehicle and honking the horn of a vehicle when the vehicle cannot be located in a large parking garage. Vehicle information is uploaded to a call center through the telematics unit. Telematics service providers can offer enhanced telematics services by supplying a subscriber with a digital handset. The telematics unit must be configured to activate and personalize these various services.

A vehicle is sold with a factory-installed telematics unit. Once the vehicle leaves a dealership the subscriber is enrolled in the telematics system database and the system is activated. The dealer calls a telematics call center using the telematics system to provide data regarding the subscriber to a communication service advisor at the telematics call center. This data is used to personalize the telematics services. The dealer must also provide details as to the telematics services desired by the subscriber to the communication service advisor in a time consuming interaction.

Alternately the telematics service is personalized after leaving the dealership. The subscriber calls the telematics call center using the telematics system to provide data to a communication service advisor at the telematics call center. The subscriber must inform the communication service advisor which telematics services they want in their subscription package during a time consuming interaction with the communication service advisor.

Information needed to personalize the personal calling feature of the telematics unit is obtained from a third party wireless provider. This information is not always available when a dealer or subscriber calls the call center to personalize the telematics service. If the information is not available, the dealer or subscriber must call the call center at a later time or the call center must make an outbound attempt to personalize the telematics unit.

It is desirable therefore, to provide a method and system for automated unit service requests from a telematics unit, that overcomes the challenges and obstacles described above.

SUMMARY OF THE INVENTION

The invention provides a method for automated unit service requests from a telematics unit. A unit request call trigger is set at the telematics unit from a call center. A unit request call is received based on the unit request call trigger. The telematics unit is configured in response to the received unit request call.

Another aspect of the invention provides a computer usable medium including computer program for automated unit service requests from a telematics unit. The computer usable medium comprises: computer program code for setting a unit request call trigger at the telematics unit from a call center; computer program code for receiving a unit request call based on the unit request call trigger; and computer program code for configuring the telematics unit in response to the received unit request call.

Another aspect of the invention provides a system for automated unit service requests from a telematics unit. The system comprises: means for setting a unit request call trigger at the telematics unit from a call center; means for receiving a unit request call based on the unit request call trigger; and means for configuring the telematics unit in response to the received unit request call.

The aforementioned and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

FIG. 2 is a flow diagram of a method for automated unit service requests from a telematics unit in accordance with one embodiment of the current invention; and FIG. 3 is a flow diagram detailing the step of configuring the telematics unit at block 270 of FIG. 2.

DETAILED DESCRIPTION OF THE PRESENTLY PREFERRED EMBODIMENTS

Figure 1:
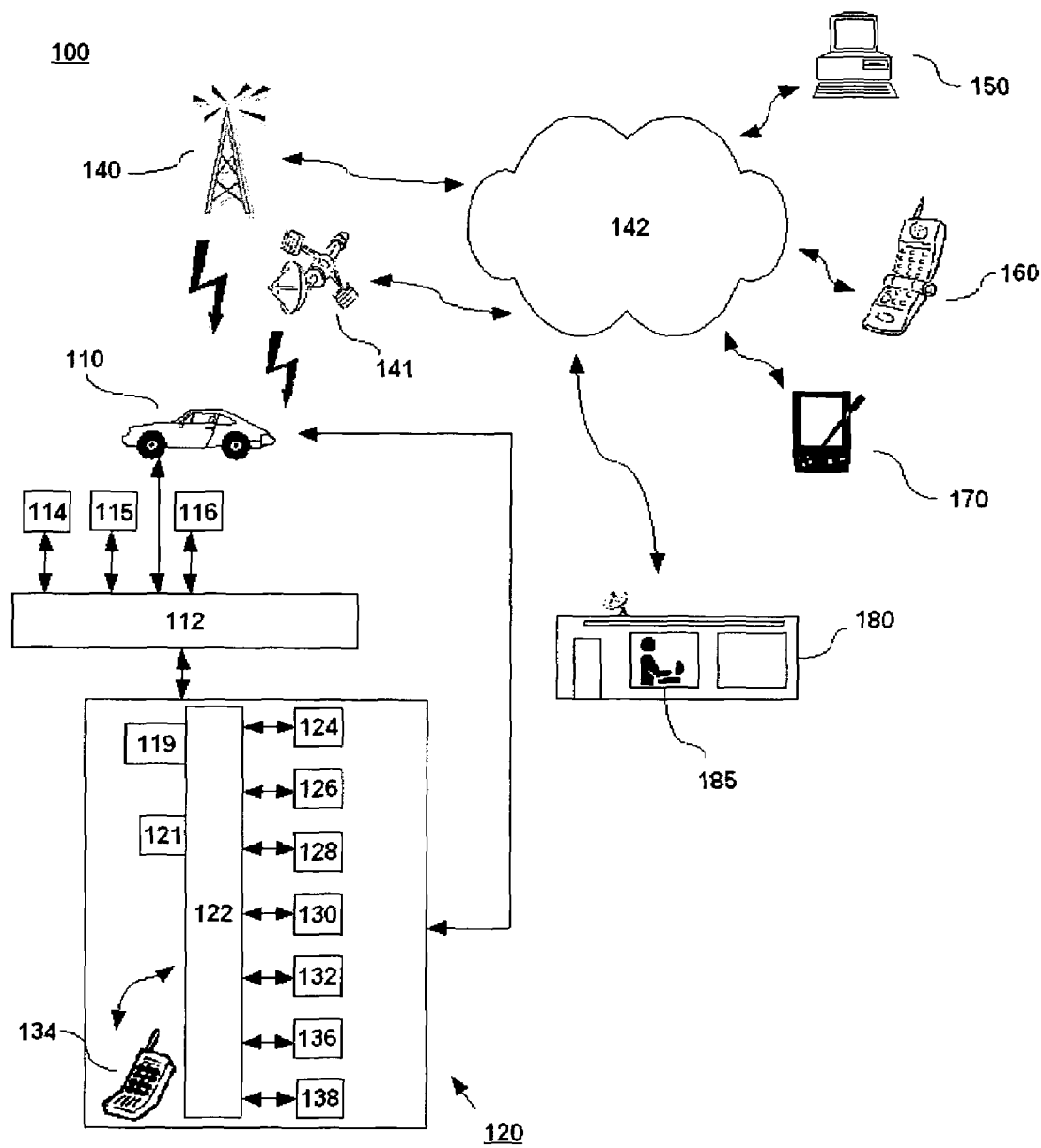
FIG. 1 is a schematic diagram of a system for automated unit service requests from a telematics unit in accordance with one embodiment of the current invention.

FIG. 1 is a schematic diagram of a system for automated unit service requests from a telematics unit in accordance with one embodiment of the current invention. The system for establishing a telephony data connection to a receiver at 100 comprises: a mobile vehicle 110, a telematics unit 120, one or more wireless carrier systems 140, or one or more satellite carrier systems 141, one or more communication networks 142, and one or more call centers 180. Mobile vehicle 110 is a vehicle such as a car or truck equipped with suitable hardware and software for transmitting and receiving speech and data communications.

In one embodiment of the invention, telematics unit comprises: a digital signal processor (DSP) 122 connected to a wireless modem 124; a global positioning system (GPS) receiver or GPS unit 126; an in-vehicle memory 128; a microphone 130; one or more speakers 132; an embedded or in-vehicle phone 134 or an email access appliance 136; and a display 138. DSP 122 is also referred to as a microcontroller, controller, host processor, ASIC, or vehicle communications processor. GPS unit 126 provides longitude and latitude coordinates of the vehicle, as well as a time stamp and a date stamp. In-vehicle phone 134 is an analog, digital, dual-mode, dual-band, multi-mode or multi-band cellular phone.

Telematics unit 120 can store GPS location data and other data files in in-vehicle memory 128. Telematics unit 120 can set or reset calling-state indicators and can enable or disable various cellular-phone functions, telematics-unit functions and vehicle functions when directed by program code running on DSP 122. Telematics unit 120 can send and receive over-the-air messages using, for example, a pseudo-standard air-interface function or other proprietary and non-proprietary communication links.

DSP 122 executes various computer programs and computer program code, within telematics unit 120, which interact with electronic and mechanical systems. DSP 122 affects communications between telematics unit 120, wireless carrier system 140 or satellite carrier system 141 communications network 142 and call center 180. A speech-recognition engine 119, which can translate human speech input through microphone 130 to digital signals used to control functions of telematics unit, is installed in telematics unit 120. The interface to telematics unit 120 includes one or more buttons (not shown) on telematics unit 120, or on an associated keyboard or keypad that are also used to control functions of telematics unit 120. A text to speech synthesizer 121 can convert text strings to audible messages that are played through speaker 132 of telematics unit 120.

Speech recognition engine 119 and buttons are used to activate and control various functions of telematics unit 120, such as placing personal calls, contacting a communication services advisor 185, or requesting emergency services. In another embodiment, the interface to telematics unit 120 includes other forms of preference and data entry including touch-screens, wired or wireless keypad remotes, or other wirelessly connected devices such as Bluetooth-enabled devices or 802.11-enabled devices.

DSP 122 controls, generates and accepts digital signals transmitted between telematics unit 120 and a vehicle communication bus 112 that is connected to various vehicle components 114, vehicle devices 115, and various sensors 116 in mobile vehicle 110. DSP 122 can activate various programming and operation modes, as well as provide for data transfers. In facilitating interactions among the various communication and electronic modules, vehicle communication bus 112 utilizes bus interfaces such as controller-area network (CAN), J1850, International Organization for Standardization (ISO) Standard 9141, ISO Standard 11898 for high-speed applications, and ISO Standard 11519 for lower speed applications.

Mobile vehicle 110 via telematics unit 120 sends and receives radio transmissions from wireless carrier system 140, or satellite carrier system 141. Wireless carrier system 140, or satellite carrier system 141 is any suitable system for transmitting a signal from mobile vehicle 110 to communication network 142.

Communication network 142 includes services from mobile telephone switching offices, wireless networks, public-switched telephone networks (PSTN), and Internet protocol (IP) networks. Communication network 142 comprises a wired network, an optical network, a fiber network, another wireless network, or any combination thereof. Communication network 142 connects to mobile vehicle 110 via wireless carrier system 140, or satellite carrier system 141.

Communication network 142 can send and receive short messages according to established protocols such as dedicated short range communication standard (DSRC), IS-637 standards for short message service (SMS), IS-136 air-interface standards for SMS, and GSM 03.40 and 09.02 standards. In one embodiment of the invention, similar to paging, an SMS communication is posted along with an intended recipient, such as a communication device in mobile vehicle 110.

Call center 180 is a location where many calls are received and serviced at the same time, or where many calls are sent at the same time. In one embodiment of the invention, the call center is a telematics call center, facilitating communications to and from telematics unit 120 in mobile vehicle 110. In another embodiment, the call center 180 is a voice call center, providing verbal communications between a communication service advisor 185, in call center 180 and a subscriber. In another embodiment, call center 180 contains each of these functions. In another embodiment, call center 180 operates in a fully automated fashion.

Communication services advisor 185 is a real advisor or a virtual advisor. A real advisor is a human being in verbal communication with a user or subscriber. A virtual advisor is a synthesized speech interface responding to requests from user or subscriber. In one embodiment, the virtual advisor includes one or more recorded messages. In another embodiment, the virtual advisor generates speech messages using a call center based text to speech synthesizer (TTS). In another embodiment, the virtual advisor includes both recorded and TTS generated messages.

Call center 180 provides services to telematics unit 120. Call center 180 sets unit request call triggers at telematics unit 120, receives a unit request call from telematics unit 120 and configures the telematics unit 120 upon receiving the unit request call. Configurations performed include base configuration and personal calling configuration. Call center 180 also receives subscriber service calls, determines if telematics unit 120 is data upload capable, and configures telematics unit 120 to initiate a unit request call at a predetermined time. Call center 180 determines available enrollment data, such as a customer data record or a personal calling number, and configures the unit request call trigger based on the available enrollment data. Data upload is comprised of transferring data from a telematics unit to a remote facility initiated by a trigger, and alternatively transferring data from a remote facility to a telematics unit based on a trigger. In one embodiment, a trigger is a condition detected to activate a function based on a logical, physical or temporal event. Examples of possible trigger conditions include an accumulated count of ignition cycles or a predetermined time and date.

Call center 180 can receive data from telematics unit 120, through wireless carrier system 140, satellite carrier systems 141, and communication network 142. Call center 180 can determine mobile identification numbers (MINs) and telematics unit identifiers associated with a telematics unit access request, compare MINs and telematics unit identifiers with a database of identifier records, and send calling-state messages to the telematics unit 120 based on the request and identification numbers. A MIN may also be referred to as a personal calling number.

Communication network 142 connects wireless carrier system 140 or satellite carrier system 141 to a user computer 150, a wireless or wired phone 160, a handheld device 170, such as a personal digital assistant, and call center 180. User computer 150 or handheld device 170 has a wireless modem to send data through wireless carrier system 140, or satellite carrier system 141, which connects to communication network 142. In another embodiment, user computer 150 or handheld device 170 has a wired modem that connects to communications network 142. Data is received at call center 180. Call center 180 has any suitable hardware and software capable of providing web services to help transmit messages and data signals from user computer 150 or handheld device 170 to telematics unit 120 in mobile vehicle 110.

FIG. 2 is a flow diagram of a method for automated unit service requests from a telematics unit in accordance with one embodiment of the current invention. In one embodiment, the automated unit service request method is a method used for telematics service enrollment wherein the services requested by the telematics subscriber are configured and activated. The method for automated unit service requests from a telematics unit at 200 begins (block 205) when a subscriber service call is received at a call center (block 210). Prior to the standard enrollment automation process making an outbound attempt to configure the telematics unit, the subscriber service call is received. The telematics unit is configured to activate and customize the telematics service features requested by the subscriber. Such features include, but are not limited to basic telematics service and security telematics service. The configuration process includes transmission of instructions from the telematics call center 180 to the telematics unit 120, which set the hardware of the installed telematics unit 120 to provide the requested service features.

The call center determines an available enrollment data. In this step of the method, the call center determines if a customer database record is expected (block 220). If a customer database record is not expected, the call center advisor must proceed with a full configuration (block 225). Since no data is available to determine what telematics service features have been requested by the subscriber, the call center advisor must obtain that information in a dialogue with the subscriber. Full configuration requires the subscriber maintain that dialogue with the call center advisor until telematics service enrollment is complete. Once full configuration is complete, the call center advisor provides the service requested by the subscriber (block 280), the subscriber call terminates (block 290) and the method ends (block 295).

If a customer database record is expected, the call center advisor requests a limited set of information from the subscriber, comprising the subscriber's name, phone number, personal identification number and zip code (block 230). This information verifies the subscriber's identity and allows the call center to determine if personal calling is available.

The call center advisor makes a determination if the telematics unit is data upload capable (block 240). If the telematics unit is not data upload capable, the call center advisor must proceed with a full configuration (block 225) since completing the inbound automated configuration of the telematics unit requires a data upload capable telematics unit. The call center provides the service requested by the subscriber (block 280), the subscriber call terminates (block 290) and the method ends (block 295).

If the telematics unit is data upload capable, the call center sets a unit request call trigger that utilizes the data upload capability (block 250). Setting the unit request call trigger requires configuration of data upload. The data upload configuration sets data upload parameters to allow the vehicle to place an inbound automated configuration call. The unit request call trigger instructs the telematics unit to initiate a unit request call at a predetermined future time, such as 10 minutes after the subscriber service call ends. By setting the unit request call trigger, the call center can determine the available enrollment data and provide time for the call center to obtain all necessary enrollment data. The call center provides the service requested by the subscriber before terminating the subscriber call (block 255).

At the predetermined time, the unit request call trigger initiates a unit request call, which is received at the call center (block 260). The call center can receive a carrier response to a generated unit request call. The carrier response comprises data regarding the service status of the unit request call. When the telematics unit generates the unit request call, the service status of the generated request call is unknown. The service status comprises data indicating the level of success or failure of the unit request call including why a request was not properly serviced. The carrier response is maintained in a database where the semantics of the data contained therein is determined. The resulting semantic interpretation of the data contained in the carrier response can be used to influence the trigger criteria and generation of subsequent unit requests. Upon receiving the unit request call, the call center configures the telematics unit (block 270), the unit request call terminates (block 292), and the method ends (block 295). Setting the unit request call trigger, the unit request call, and configuration of the telematics unit occurs without subscriber involvement.

FIG. 3 is a flow diagram detailing the step of configuring the telematics unit at block 270 of FIG. 2. The step of configuring the telematics unit at 300 begins (block 305) with the call center determining available enrollment data (block 310). The call center determines if personal calling is available (block 320). Personal calling is cell phone service provided by the telematics service provider through a wireless provider. If personal calling is not available the call center waits to receive the unit request call (block 325). When the unit request call is received the call center performs a base configuration (block 330). The base configuration configures the telematics unit with the features requested by the subscriber and the unit request call ends (block 395).

If personal calling is available the call center requests a personal calling number from a wireless provider (block 340). The personal calling number may or may not be available prior to the unit request call (block 342). If the personal calling number is available prior to the unit request call, the call center waits to receive the unit request call (block 345). When the unit request call is received the call center performs a base configuration and a personal calling configuration (block 350). The personal calling configuration configures the subscriber cell phone with the personal calling number assigned by the wireless provider and the unit request call ends (block 395).

If the personal calling number is not available prior to the unit request call, the call center waits to receive the unit request call (block 355). When the unit request call is received the call center performs the base configuration only (block 360) and resets the unit request call trigger to initiate another unit request call at a predetermined future time, such as 48 hours after the current unit request call ends (block 362). The call center waits to receive the unit request call (block 365). When the unit request call is received the call center determines if the personal calling number is available (block 370). If the personal calling number is available (block 370), personal calling configuration is performed (block 375) and the step ends (block 395). If the personal calling number is not available, the call center resets the unit request call trigger to initiate another unit request call at a predetermined future time (block 362). The next unit request call occurs, for example, 48 hours after the current unit request call ends. The call center waits to receive the unit request call (block 365). This loop repeats until the personal calling number is available and the personal calling configuration is performed (block 375), at which time the step ends (block 395). Upon completion of the automated inbound configuration method, the telematics unit is fully configured and telematics service enrollment is complete.

In one embodiment, the unit request call trigger, as in block 362, is set for a predetermined time based on a carrier response. In such embodiment, the carrier response may indicate, for example, that the MIN is unavailable and the unit request call trigger will be set for a time when the MIN is estimated to be available. In another example, the carrier response may indicate that a manual activation market is needed, and the unit request call trigger will be set accordingly. Those of ordinary skill in the art are acquainted with carrier responses, and reasons for failure to obtain a MIN. Thus, receiving a carrier response to a generated unit request call, wherein the carrier response indicates MIN availability; results in resetting the unit request call trigger responsive to the carrier response.

While embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method for automated unit service requests from a telematics unit, the method comprising:
   setting a unit request call trigger at the telematics unit from a call center;
   receiving a unit request call based on the unit request call trigger; and
   configuring the telematics unit in response to the received unit request call;
   wherein the step of receiving a unit request call based on the unit request call trigger comprises:
      receiving a carrier response to a generated unit request call, wherein the carrier response indicates MIN availability; and
      resetting the unit request call trigger responsive to the carrier response.

2. The method of claim 1, further comprising:
   determining at the call center an available enrollment data; and configuring the unit request call trigger based on the determination.

3. The method of claim 2 wherein determining available enrollment data comprises:
   determining if a customer data record is expected.

4. The method of claim 1 wherein configuring the telematics unit comprises performing a base configuration.

5. The method of claim 4 wherein configuring the telematics unit further comprises performing a personal calling configuration.

6. The method of claim 1 wherein the unit request call is received at the call center responsive to the unit request call trigger at the telematics unit.

7. The method of claim 1 wherein the unit request call is an automated inbound configuration call whereby the telematics unit and a subscriber cell phone is configured based on an available enrollment data and a MIN.

8. A computer readable medium encoded with a computer program for automated unit service requests from a telematics unit, comprising:
   computer program code for setting a unit request call trigger at the telematics unit from a call center;
   computer program code for receiving a unit request call based on the unit request call trigger;
   computer program code for configuring the telematics unit in response to the received unit request call; and
   computer program code for receiving a carrier response to a generated unit request call.

9. The computer readable medium of claim 8, further comprising:
   computer program code for determining at the call center an available enrollment data; and
   computer program code for configuring the unit request call trigger based on the determination.

10. The computer readable medium of claim 9 wherein computer program code for determining available enrollment data comprises:
    computer program code for determining if a customer data record is expected.

11. The computer readable medium of claim 8 wherein computer program code for configuring the telematics unit comprises:
    computer program code for performing a base configuration.

12. The computer readable medium of claim 8 wherein computer program code for configuring the telematics unit comprises:
    computer program code for performing a base configuration; and computer program code for performing a personal calling configuration.

13. A system for automated unit service requests from a telematics unit comprising:
    means for setting a unit request call trigger at the telematics unit from a call center;
    means for receiving a unit request call based on the unit request call trigger;
    means for configuring the telematics unit in response to the received unit request call; and
    means for receiving a carrier response to a generated unit request call.

14. The system of claim 13, further comprising:
    means for determining at the call center an available enrollment data; and
    means for configuring the unit request call trigger based on the determination.

15. The system of claim 13 wherein means for configuring the telematics unit comprises:
    means for performing a base configuration; and
    means for performing a personal calling configuration.

16. A method for automated unit service requests from a telematics unit, the method comprising:
    setting a unit request call trigger at the telematics unit from a call center;
    receiving a unit request call based on the unit request call trigger; and
    configuring the telematics unit in response to the received unit request call;
    wherein setting a unit request call trigger comprises:
       receiving a subscriber service call at the call center;
       determining if the telematics unit is data upload capable; and
       configuring the telematics unit to initiate the unit request call at a predetermined time based on the determination.

17. A method for automated unit service requests from a telematics unit, the method comprising:
    setting a unit request call trigger at the telematics unit from a call center;
    receiving a unit request call based on the unit request call trigger;
    configuring the telematics unit in response to the received unit request call;
    determining at the call center an available enrollment data; and configuring the unit
    request call trigger based on the determination;

wherein determining available enrollment data comprises determining if a personal calling number is available.

18. A computer readable medium encoded with a computer program for automated unit service requests from a telematics unit, comprising:
   computer program code for setting a unit request call trigger at the telematics unit from a call center;
   computer program code for receiving a unit request call based on the unit request call trigger; and
   computer program code for configuring the telematics unit in response to the received unit request call;
   wherein computer program code for setting a unit request call trigger comprises:
      computer program code for receiving a subscriber service call at the call center;
      computer program code for determining if the telematics unit is data upload capable; and
      computer program code for configuring the telematics unit to initiate the unit request call at a predetermined time based on the determination.

19. A computer readable medium encoded with a computer program for automated unit service requests from a telematics unit, comprising:
   computer program code for setting a unit request call trigger at the telematics unit from a call center;
   computer program code for receiving a unit request call based on the unit request call trigger;
   computer program code for configuring the telematics unit in response to the received unit request call;
   computer program code for determining at the call center an available enrollment data; and
   computer program code for configuring the unit request call trigger based on the determination;
   wherein computer program code for determining available enrollment data comprises computer program code for determining if a personal calling number is available.

20. A method for automated unit service requests from a telematics unit, the method comprising:
   setting a unit request call trigger at the telematics unit from a call center;
   receiving a unit request call based on the unit request call trigger; and
   configuring the telematics unit in response to the received unit request call;
   wherein the unit request call trigger is a condition detected to activate a function based on an event occurrence.

* * * * *